United States Patent
Harvey et al.

(10) Patent No.: US 8,370,475 B1
(45) Date of Patent: Feb. 5, 2013

(54) KEEP MY OPT-OUTS

(75) Inventors: Sean Harvey, Astoria, NY (US);
Michael West, Munich (DE); Rajas Moonka, San Ramon, CA (US); Jochen Eisinger, Munich (DE)

(73) Assignee: Google Inc., Mountain View, CA (US)

( * ) Notice: Subject to any disclaimer, the term of this patent is extended or adjusted under 35 U.S.C. 154(b) by 38 days.

(21) Appl. No.: 13/245,452

(22) Filed: Sep. 26, 2011

(51) Int. Cl.
*G06F 15/173* (2006.01)
*G06F 15/16* (2006.01)

(52) U.S. Cl. ........ 709/223; 709/224; 709/225; 709/226; 709/227

(58) Field of Classification Search ........... 709/223–227
See application file for complete search history.

(56) References Cited

U.S. PATENT DOCUMENTS

| | | | | |
|---|---|---|---|---|
| 6,959,420 | B1 * | 10/2005 | Mitchell et al. | 715/745 |
| 8,112,550 | B2 * | 2/2012 | Wilson | 709/248 |
| 2003/0167195 | A1 * | 9/2003 | Fernandes et al. | 705/8 |
| 2010/0153516 | A1 * | 6/2010 | Weinberg et al. | 709/217 |
| 2011/0022681 | A1 * | 1/2011 | Simeonov | 709/217 |
| 2011/0145628 | A1 * | 6/2011 | Wilson | 714/4.2 |
| 2011/0191664 | A1 * | 8/2011 | Sheleheda et al. | 715/205 |

OTHER PUBLICATIONS

"Google Advertising Cookie Opt-out Plugin," http://www.google.com/ads/preferences/plugin/, accessed on May 6, 2011, 1 page.
"HTTP Cookie," From Wikipedia, the free encyclopedia, http://en.wikipedia.org/wiki/HTTP_cookie, last modified on Jun. 6, 2011, accessed on Jun. 9, 2011, 17 pages.
"Network Advertising Initiative, FAQs" http://www.networkadvertising.org/managing/faqs.asp, accessed on Apr. 29, 2011, 5 pages.
"Ghostery," *WayBack Machine Beta*, http://web.archive.org/web/20110711092315/http://www.ghostery.com/, date range from Dec. 17, 2008 to Jul. 11, 2011, page last modified on Jul. 11, 2011, accessed on Dec. 16, 2011, 1 page.
"Ghostery," http://www.ghostery.com/, accessed on Feb. 21, 2012, 1 page.
"Adblock Plus—for annoyance-free web surfing," *WayBack Machine Beta*, http://web.archive.org/web/20110724224221/http://adblockplus.org/en/, date range from Jun. 27, 2006 to Jul. 24, 2011, page last modified on Jul. 24, 2011, accessed on Dec. 16, 2011, 2 pages.
"Adblock Plus—for annoyance-free web surfing," http://adblockplus.org/en/, accessed on Feb. 21, 2012, 1 page.

* cited by examiner

*Primary Examiner* — Minh-Chau Nguyen
(74) *Attorney, Agent, or Firm* — Sterne, Kessler, Goldstein & Fox P.L.L.C.

(57) ABSTRACT

A browser extension acts as a cross-domain persistent cookie opt-out by providing opt-out cookies. This allows users to opt-out of interest-based advertising by simply downloading one extension, essentially acting as a mechanism that prevents ad companies from personalizing ads on a per browser basis. Furthermore, opt-out cookies persist across otherwise destructive actions, such as deleting stored cookies.

20 Claims, 5 Drawing Sheets

KEEP MY OPT-OUTS

BACKGROUND

1. Field of the Invention

This field is generally related to management of cookies in a web browser.

2. Related Art

A cookie, also known as a web cookie, browser cookie, and HTTP cookie, is a piece of text stored on the computer of a user by a web browser. A cookie can be used for authentication, storing site preferences, shopping cart contents, or any other goal that can be accomplished through storing text data.

A cookie is comprised of one or more name-value pairs containing textual information, which may be encrypted for information privacy and data security purposes. The cookie is sent as a field in the header of the HTTP response by a web server to a web browser and then sent back by the browser each time it accesses that server.

Cookies may be set by the server with or without an expiration date. Cookies without an expiration date exist until the browser terminates, while cookies with an expiration date may be stored by the browser until the expiration date passes. Users may also manually delete cookies in order to save space or to address privacy issues.

As text, cookies are not executable. Because they are not executed, they cannot replicate themselves and are not viruses. However, since cookies may store private information and can be read remotely, they can be a privacy concern. Cookies can empower a server by facilitating online data collection and personalized advertising.

Most modern browsers allow users to decide whether to accept cookies, and the time frame to keep them. However, rejecting cookies makes some websites unusable.

Cookies may be divided into two kinds, session cookies and persistent cookies. A session cookie only lasts for the duration of a session that accesses a website. It will expire if a user closes his or her browser, or if a user has not visited the server for a certain period of time (called session idle timeout, in which case, the server will expire, invalidating the user session).

By contrast, a persistent cookie will outlast user sessions. If a persistent cookie has its Max-Age set to 1 year, then, within the year, the initial value set in that cookie would be sent back to a server every time the user visits the server. This could be used to record a vital piece of information such as how the user initially came to that website.

Persistent cookies can be used by advertising websites to keep track of information about users of the websites, allowing advertising websites to target online advertisements to users. While using persistent cookies in this way is quite helpful to owners of advertising websites, such a use of persistent cookies can provide advertisers with information that users would prefer that they not collect.

Thus, it would help users to offer a way to prevent persistent cookies from being used on their system, especially persistent cookies that are used for advertising purposes. Prior approaches have used preexisting lists of sites to manage opting out of cookies. For example, prior approaches have developed solutions for using opt-out cookies from preexisting lists to manage persistent cookies. However, there has not yet been a successful solution that has a mechanism in place to ensure that the opt-out cookies specified on that list are set all at once. Additionally, approaches have not provided that the opt-out cookies will persist across otherwise destructive user actions, such as a user clearing his or her browser cookies.

BRIEF SUMMARY

A computer-implemented method, system, and computer-readable storage medium are provided for managing persistent cookies in a web browser. A persistent cookie management tool installed in the web browser scans a cookie repository of the web browser to identify a website associated with at least one persistent cookie. The persistent cookie management tool is executed by one or more processors. For the identified website, the persistent cookie management tool stores at least one persistent opt-out cookie, associated with the identified website, such that the at least one persistent opt-out cookie is protected from being changed. The at least one persistent opt-out cookie is transmitted to the identified website, causing the website to block interest-based advertising. Any other persistent cookies associated with the identified website that are present in the cookie repository may optionally be deleted. For the identified website, the persistent cookie management tool may optionally prevent additional persistent cookies from being stored in the cookie repository by the website.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Each of the constituent parts of a system embodiment may be implemented on any computer system 100. Such computer system 100 can include, but is not limited to, a personal computer, mobile device such as a mobile phone, workstation, embedded system, game console, television, set-top box, or any other computer system 100. Further, computer system 100 can include, but is not limited to, a device having a processor and memory for executing and storing instructions. Software may include one or more applications and an operating system. Hardware can include, but is not limited to, a processor, memory and graphical user interface display. Computer system 100 may also have multiple processors and multiple shared or separate memory components. For example, computer system 100 may be a clustered computing environment or server farm.

Each of the constituent parts of a system embodiment may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

It should be noted that computer-readable medium embodiments may include any physical medium which is capable of encoding instructions that may subsequently be used by a processor to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible, persistent storage that can serve in the role of providing instructions to a processor may be used to store the instructions in these embodiments.

Figure 1:
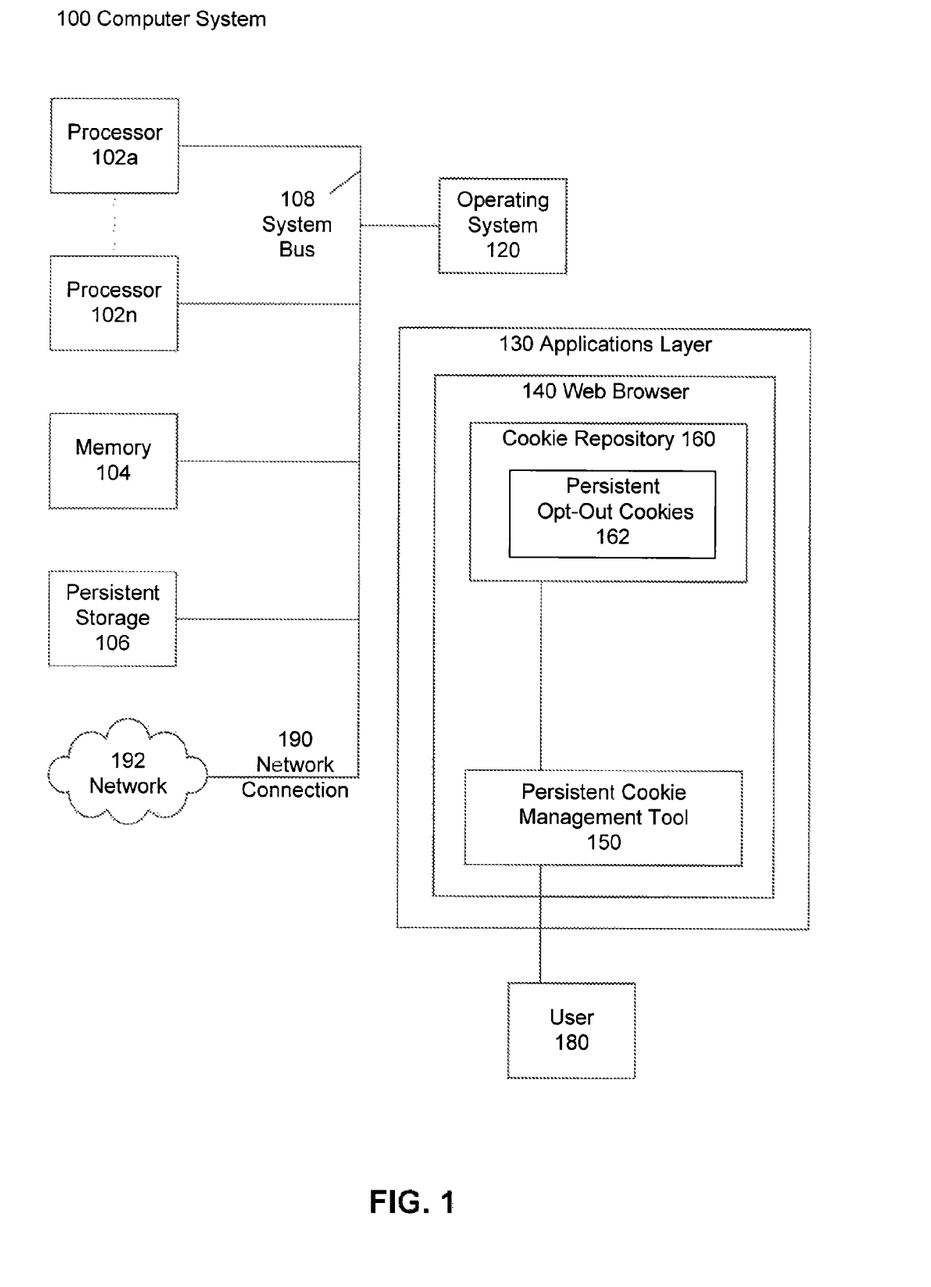
FIG. 1 is a diagram illustrating an exemplary system.

FIG. 1 is a diagram illustrating an exemplary system. A computer system 100 provides for managing persistent cookies in a web browser.

The processing task in the embodiment of FIG. 1 is carried out by one or more processors 102a . . . 102n. It should be noted that any type of processing technology may be used here, including multi-core processors, multiple processors, or distributed processors. Additional specialized processing resources such as graphics, multimedia, or mathematical processing capabilities, either in hardware or in software, may also be used as adjuncts or replacements for processors 102a . . . 102n tier certain processing tasks.

In order to manipulate data, processors 102a . . . 102n access a memory 104 via system bus 108. For data which needs to be stored more permanently, processors 102a . . . 102n access persistent storage 106. Processors 102a . . . 102n, memory 104 and persistent storage 106 operate in coordination with operating system 120 to provide basic functionality for computing device 100. Operating system 120 provides support functionality for a layer of applications 130. In the context of the applications layer 130, computer system 100 executes a web browser 140.

Web browser 140 in application layer 130 has access to the Web over a network 192 via a network connection 190. Computer system 100 may be a conventional computer such as a desktop or laptop PC, but it may additionally be any Web-enabled peripheral such as a game console, a tablet, a netbook or a smartphone. Computer system 100 as shown in FIG. 1 may be organized around a system bus 108, but any type of infrastructure that allows the hardware infrastructure elements of computer system 100 to communicate with and interact with each other may be used to function as this part of computer system 100.

Web browser 140 includes a variety of subsystems that interact with each other to help manage persistent cookies. For example, there may be implemented in web browser 140 a persistent cookie management tool 150. Persistent cookie management tool 150 receives input from a user 180 that user 180 desires to opt-out of persistent cookies. Web browser 140 also includes a cookie repository 160. Within cookie repository 160, web browser 140 stores a set of persistent opt-out cookies 162. If a site has at least one valid persistent opt-out cookie associated with it, then when web browser 140 accesses that website, the at least one persistent opt-out cookie is transmitted to the website and the website responds by blocking interest-based advertising. It is to be noted that certain websites may require multiple opt-out cookies. The opt-out cookies express a user preference that relies on the website for implementation. Optionally, persistent cookie management tool 150 may detect any persistent cookies that the website attempts to store, and prevent them from being stored. However, this is one mechanism for managing of opting-out of cookies, but not the only one. Removing non-session cookies entirely is an optional step that is not essential to the operation of the opt-out mechanism, as member networks who have standardized the server-side practice of opt-out cookie support can continue to use persistent cookies for purposes other than interest-based advertising. Persistent cookie management tool is configured to adapt to the requirements of various websites, so that persistent cookies may be blocked from any website that uses persistent cookies.

Persistent cookie management tool 150 may provide for regulation of cookies in certain advantageous ways. For example, persistent cookie management tool may allow a session cookie for a website with a persistent opt-out cookie. The reason why session cookies may be allowed is that they add functionality to certain websites while they are being used during a session, but since they are automatically deleted at the end of a session, they cause less risk of persistent storage of information that the user would prefer not to share. Hence, persistent cookie management tool 150 may allow session cookies to be stored in cookie repository 160, regardless of whether opting-out of cookies is on or off. Therefore, features of websites that depend on session cookies should not be affected by the persistent cookie management tool 150, as the persistent cookie management tool does not affect the installation, operation, or removal of session cookies. Should user 180 desire to block session cookies, the appropriate action to take is to block all cookies by adjusting the preferences of web browser 140.

The persistent opt-out cookies are persistent in that they never expire, and they are not deleted if the user clears cookies. In general, the persistent opt-out cookies are protected from changes. To remove or change the persistent opt-out cookies, the user must specifically turn off opting-out in persistent cookie management tool 150. To turn off opting-out of cookies, user 180 may take action, such as selecting a menu item or a button. This action may provide user 180, for example, with access to a dialog or another type of window that allows user 180 to set control options for persistent cookie management tool 150. The control options may accept user input that turns opting-out on and off. For example, there may be controls such as buttons that allow user 180 to turn the opting-out on and off. However, it will be readily realized that any control that allows user 180 to signal to persistent cookie management tool 150 that they wish to turn opting-out an or off may be used in this context. As noted above, turning off the opting-out causes persistent cookie management tool 150 to remove persistent opt-out cookies 162 from cookie repository 160.

Because persistent cookie management tool 150 is implemented in web browser 140, it can allow certain different approaches to cookie management in different embodiments. One of the goals is to block persistent cookies as universally as possible, so that all persistent cookies can be blocked with a single opting-out step. An exemplary embodiment accomplishes this goal by handling persistent opt-out cookie formats in related ways, though other ways may be used as well, in other embodiments.

In one embodiment, persistent opt-out cookies may be in different formats, depending upon the specific website with which they are associated. For example, "amazonoptout=yes" could be associated with Amazon's website, or "yahoooptout=on" could be associated with Yahoo's website. Since cookies are stored as name-value pairs, then the name of the persistent opt-out cookie must be correct, and the value must be set appropriately such that the persistent opt-out cookie is activated (that is, in the example, a persistent opt-out cookies that stores "amazonoptout=no") would not be considered to act as an opt-out cookie. As noted above, multiple cookies may be involved in the opting-out process. Certain embodiments may use a predefined list to establish the formats of various ones of the persistent opt-out cookies. Based on the format that is used, sets of one or more persistent opt-out cookies may be associated with websites so that persistent cookie management tool 150 is able to determine which website needs to have its persistent cookies managed based on the presence of the associated one or more persistent cookies.

If a predefined opt-out cookie is stored in cookie repository 160, persistent cookie management tool 150 may optionally block further cookies in several ways, according to various embodiments. In one embodiment, persistent cookie management tool 150 intercepts a request for a website with associated persistent cookies by a web browser 140. In this embodiment, persistent cookie management tool 150 prevents the storage of persistent cookies, such that the persistent cookies are never stored. In an alternative embodiment, the persistent cookies are stored as usual, but are immediately deleted. There are two exemplary variants of this embodiment. In one variant, only the new persistent cookies are deleted, and the persistent opt-out cookies 162 are left untouched. In another variant, all persistent cookies (opt-out and regular) associated with a website in cookie repository 160 are deleted, and then immediately after deletion, persistent cookie management tool 150 reinstalls the persistent opt-out cookies 162. Thus, several embodiments manage persistent cookies in ways that cause the same result state, even if different approaches are taken to get there. In the result state, after persistent cookie management tool 150 has acted, the new persistent cookies may optionally not be stored but the persistent-out cookies 162 will always interact with the website in a manner that blocks interest-based advertising.

Persistent cookie management tool 150 may additionally be configured to only opt out of cookies that are used for advertising purposes. It may be possible for persistent cookie management tool 150 to make the determination as to whether a cookie is used for advertising purposes in at least two ways, according to various embodiments. In one embodiment, a centralized list specifies which cookies corresponding with which websites are to be considered advertising cookies. In another approach, naming conventions specify which cookies are advertising cookies.

As the user accesses additional websites via web browser 140, if opting-out is on, persistent cookie management tool 150 may be configured to repeat the opting-out process, which includes the transmitting of opt-out cookies to a website that persistent cookie management tool 150 carried out initially, extended to the additional website. Accordingly, when a new website is accessed, persistent cookie management tool 150 may, in certain embodiments, store a persistent opt-out cookie in persistent opt-out cookie storage 162, optionally delete any persistent cookies that were previously stored in conjunction with the presently accessed website in cookie repository 160, and transmit the persistent opt-out cookie to block interest-based advertising, as discussed above. It should be noted that it is sometimes necessary to store multiple persistent opt-out cookies in association with a single website, all of which must be set properly to allow opting-out. If a website already has a persistent opt-out cookie, all that will be required is to continue blocking interest-based advertising. For example, cookie usage may only be blocked for advertising purposes.

Computer system 100 may use network connection 190 to communicate with other processing machines via network 192. Network connection 190 may be a wired connection such as Ethernet, token ring, or optical, DSL, cable, or phone connections in conjunction with an appropriate modem. Similarly, appropriate wireless technology may be used to act as network connection 190 to access network 192. Network 192 may be the Internet, a local area network, or any other network 192 of machines with which computer system 100 may exchange data.

Each of the constituent parts of computer system 100 may be implemented in hardware, software, firmware, or any combination thereof. Furthermore, each of the information storage parts of the computer system 100 may be stored in any type of structured memory, including a persistent memory. In examples, such a persistent memory may be implemented as a database, including a relational database.

Overview of the Method

Figure 2:
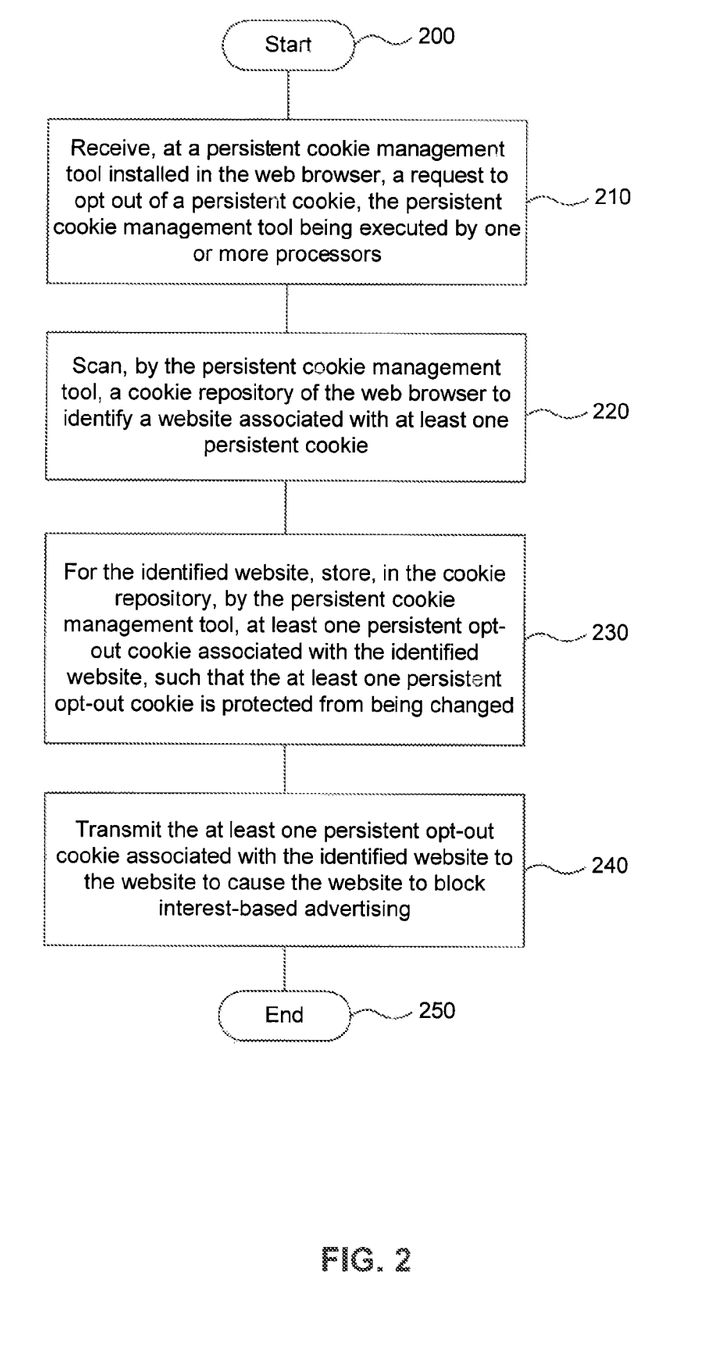
FIG. 2 is a flowchart of an exemplary method.

FIG. 2 is a flowchart of an exemplary computer-implemented method for managing persistent cookies in a web browser. The computer-implemented method includes several stages, from 200 to 250. The computer-implemented method begins with stage 200, Start.

Stage 210 includes receiving at a persistent cookie management tool installed in the web browser a request to opt out of a persistent cookie, the persistent cookie management tool being executed by one or more processors. Stage 210 is carried out by receiving input from user 180 at persistent cookie management tool 150 installed in web browser 140, executed by processors 102a ... 102n. It should be noted that stage 210 is an optional stage and not all method embodiments will necessary include stage 210. For an example, an embodiment may be designed to automatically use persistent opt-out cookies without a receiving a specific request to do so.

Stage 220 includes scanning, by the persistent cookie management tool, a cookie repository of the web browser to identify a website associated with at least one persistent cookie. Stage 220 is carried out by persistent cookie management tool 150 in conjunction with cookie repository 160. The scanning process identifies persistent cookies in cookie repository 160. As discussed above, persistent cookie management tool is then able to identify, from the formats of cookies, which websites with which the cookies are associated.

Stage 230 includes, for the identified website, storing, in the cookie repository, by the persistent cookie management tool, at least one persistent opt-out cookie associated with the identified website, such that the at least one persistent opt-out cookie is protected from being changed. For example, merely clearing cookie storage will not be sufficient to remove the at least one persistent opt-out cookie. Stage 230 is carried out by persistent cookie management tool 150, which may store persistent opt-out cookies at persistent opt-out cookie storage 162 within cookie repository 160.

Stage 240 includes transmitting the at least one persistent opt-out cookie associated with the identified website to the website to cause the website to block interest-based advertising. Stage 240 is carried out by persistent cookie management tool 150, preventing interest-based advertising in web browser 140.

The computer-implemented method ends at stage 250.

The computer-implemented method offers several advantages over prior approaches to persistent cookie management. One advantage is simplicity, and another is comprehensiveness. User 180 can quickly and easily opt-out of persistent cookies. Furthermore, user 180 is able to opt out of interest-based advertising by generating opting-out cookies for all relevant websites with persistent cookies at once. Unlike some prior approaches, the present embodiments allow opting-out of all persistent cookies with one simple input and opting-out cookies withstand destructive actions by users. Furthermore, additional embodiments allow additional flexibility, such as by allowing session cookies, or even cookies with functionality that is not advertising functionality that does not pose privacy issues.

Figure 3:
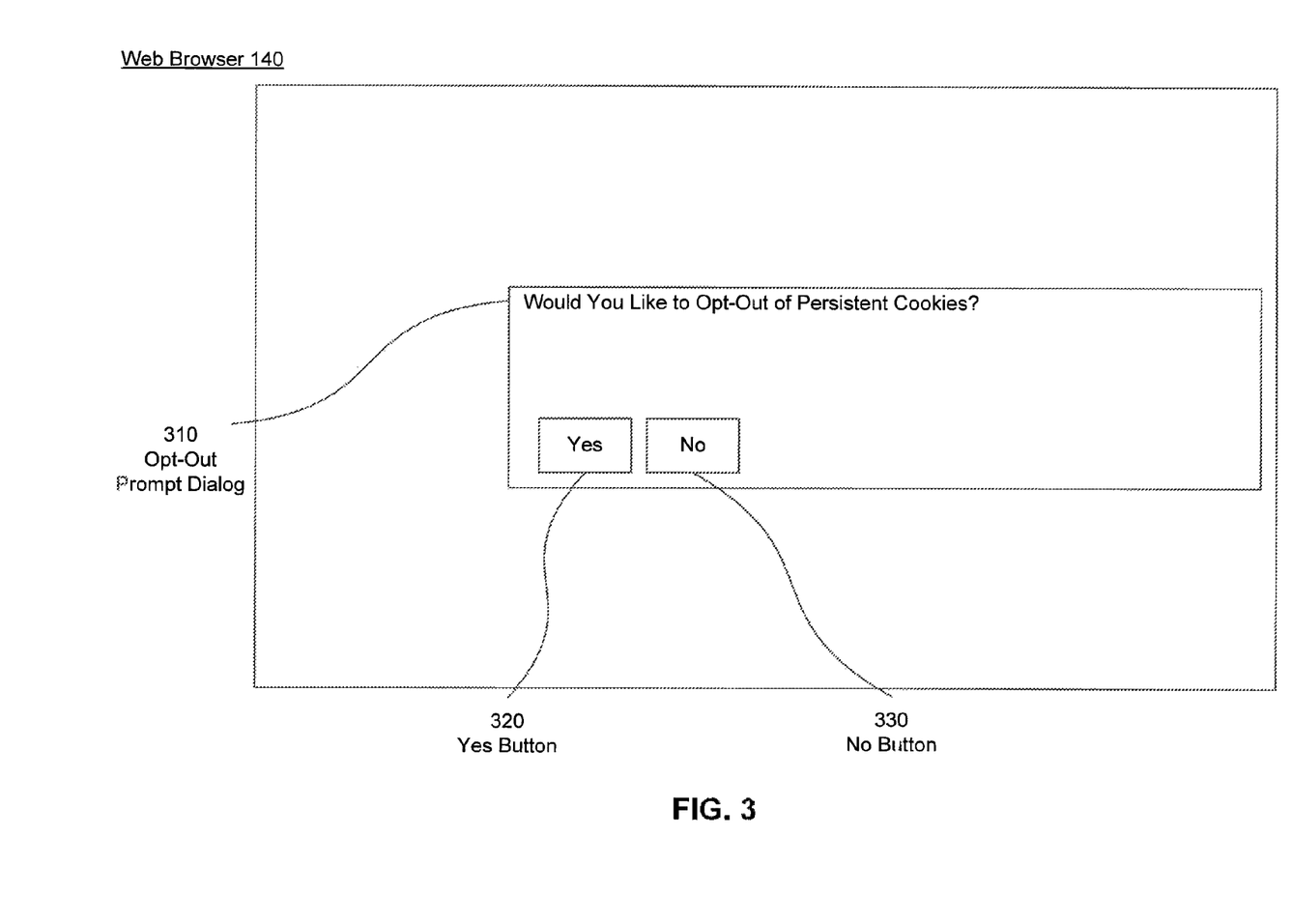
FIG. 3 is a diagram illustrating a dialog box that allows a user to opt-out of persistent cookies.

FIG. 3 is a diagram illustrating a dialog box that allows a user to opt-out of persistent cookies. FIG. 3 assumes that persistent cookie management tool 150 has been installed into web browser 140. Such installation may be performed in a known way, such as a network download or installation from removable media. Once persistent cookie management tool 150 is installed, it prompts user 180 with opt-out prompt dialog 310, which asks user 180, "Would You Like to Opt-Out of Persistent Cookies?", and offers the options of "Yes" (at Yes Button 320) and "No" (at No Button 330). User 180 may then activate opting-out by choosing Yes Button 320, or forego opting-out by choosing No Button 330. Should user 180 forego opting out when persistent cookie management tool 150 is originally installed, user 180 may choose to turn it on subsequently. For example, user 180 may select a menu option in the browser or otherwise access the controls of persistent cookie management tool 150 as discussed above, and thereby be able to access opt-out prompt dialog 310 again, so that user 180 may choose Yes Button 320 and turn on opting-out of persistent cookies.

Figure 4:
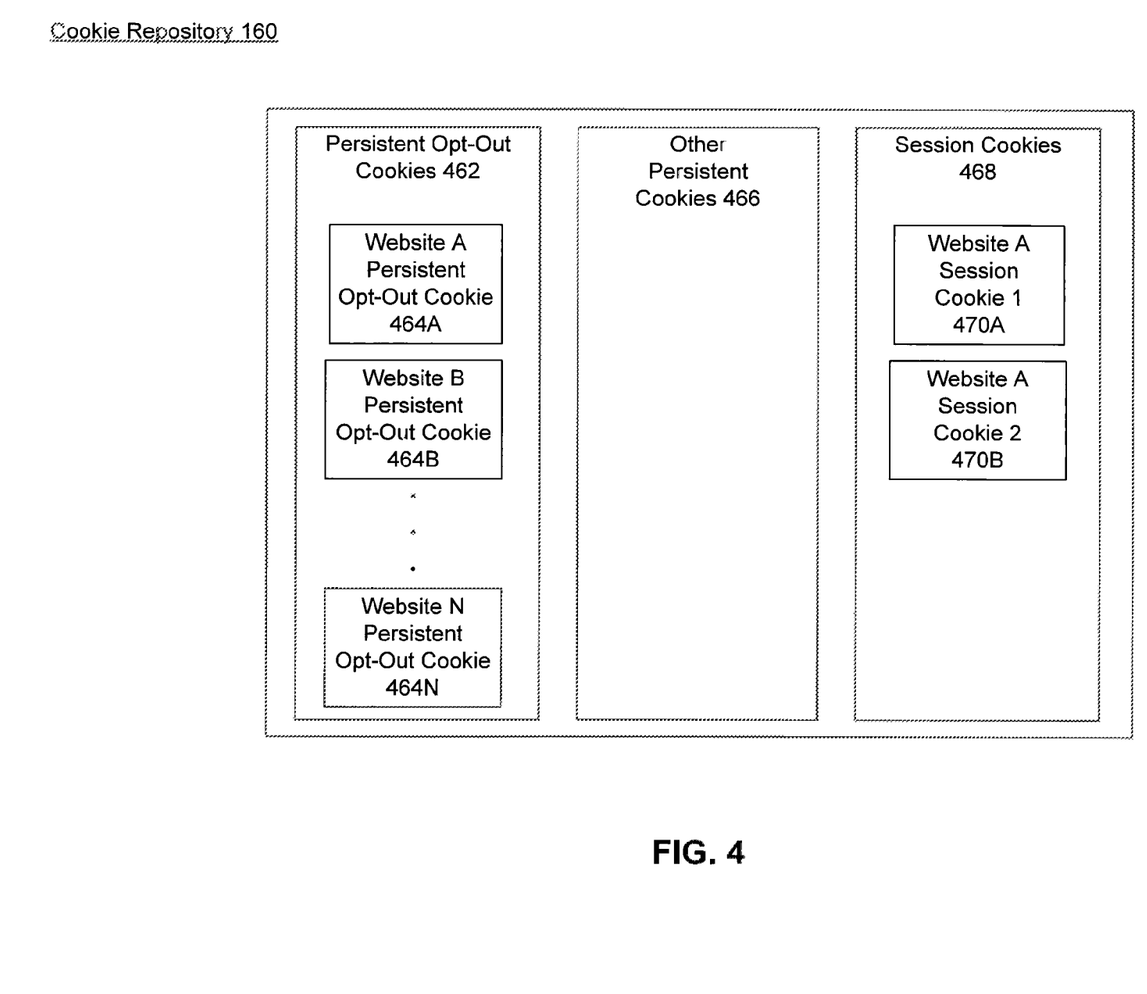
FIG. 4 is a diagram that illustrates the structure of the cookie repository.

FIG. 4 is a diagram that illustrates the structure of cookie repository 160. Cookie repository 160 generally contains three types of cookies. Persistent opt-out cookies storage 462 in cookie repository 160 stores persistent opt-out cookies that are associated with specific websites. For example, persistent opt-out cookies storage 462 may store website A persistent opt-out cookie 464A, website B persistent opt-out cookie 464B . . . website N persistent opt-out cookie 464N. These persistent opt-out cookies may be formatted in various ways as discussed above in order to comply with the appropriate format used by the website they correspond to, and will cause persistent cookie management tool 150 to block storage of additional persistent cookies as discussed above.

Other persistent cookies storage 466 acts as a storage for persistent cookies that are not opt-out cookies (which are stored separately). FIG. 4 represents the state of cookie repository 160 where opting-out has been turned on and thus other persistent cookies storage 466 is empty because persistent cookie management tool 150 optionally keeps it empty. Session cookies storage 468 stores cookies that remain active for one session and are deleted automatically when the connection is terminated. For example, session cookies storage 468 may store website A session cookie 470A and website A session cookie 470B to maintain session integrity while communicating actively with website A. Web browser 140 will delete the session cookies when the connection lapses.

Figure 5:
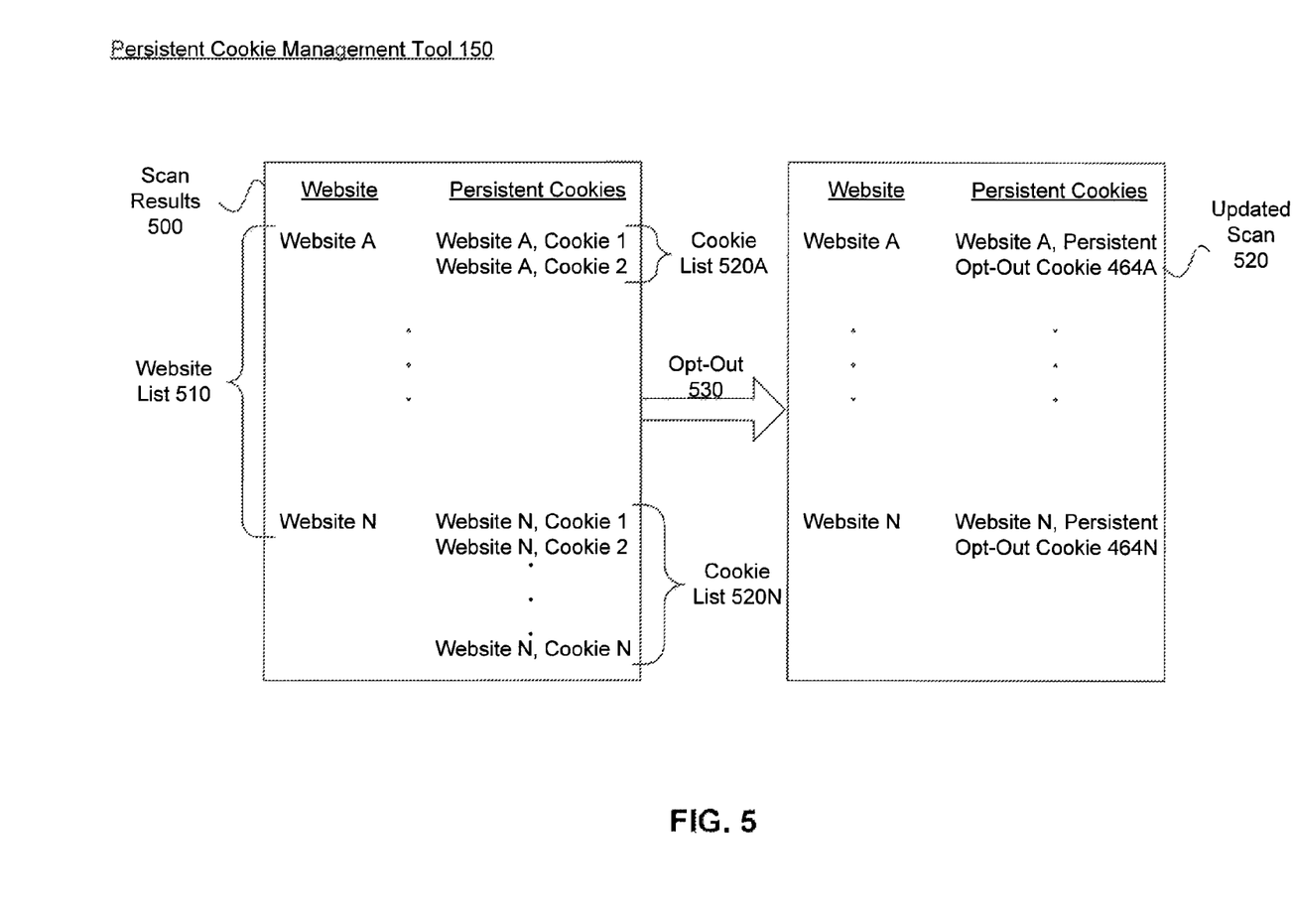
FIG. 5 is a diagram that illustrates how the persistent cookie management tool scans for persistent cookies and installs persistent opt-out cookies.

FIG. 5 is a diagram that illustrates how the persistent cookie management tool scans for persistent cookies and installs persistent opt-out cookies. When opting-out is turned on, persistent cookie management tool 150 scans cookie repository 160 to obtain scan results 500. While they are displayed here for easy reference, scan results 500 need not be displayed and may simply be operated on internally. Scan results 500 include a website list 510 that is a list of websites with associated persistent cookies, such as website A . . . website N. It should be noted that not all websites will necessarily have persistent cookies associated with them, and those that do not will not appear in website list 510. Each of the websites in website list 510, such as website A and website N will be associated with cookie lists, such as cookie list 520A and cookie list 520N respectively. As can be seen, cookie lists 520A . . . 520N contain specific persistent cookies that are associated with the websites. For example, cookie list 520A provides for persistent cookie 1 and persistent cookie 2 in association with website A, and cookie list 520N provides for persistent cookie 1, persistent cookie 2 . . . persistent cookie N in association with website N.

When opting-out is installed or turned on as per FIG. 3, the opting-out process 530 transforms the results of the scans. The scanning may be repeated to verify that opting-out has occurred successfully. The results of scanning the cookie repository after the opting-out process 530 are updated scan 520. In updated scan 520, it can be seen that websites A . . . N now each have a single persistent opt-out cookie associated with them, and no further persistent cookies. It should be noted that the scanning may be appropriately modified to comply with various exemplary embodiments discussed above, such as by ignoring session cookies, or only reacting to advertising cookies.

Opting-out functionality provided by embodiments is designed to help protect the privacy of users in an easy, simple way. When embodiments are turned off, they have no effect on cookies. In this situation, cookies may be blocked entirely or cleared in the ordinary way. However, as discussed above, current solutions are relatively inflexible with respect to how cookies are managed. Blocking cookies entirely can prevent the use of temporary cookies such as session cookies, which present less of a privacy threat than persistent cookies and which may be necessary for the operation of certain websites. While certain approaches can opt-out of persistent cookies, the opting-out does not persist if the user clears cookies.

By contrast, embodiments provide considerable privacy advantages without any significant privacy risks. When embodiments are activated, they prevent uses of cookies that may pose a privacy threat, such as persistent advertising cookies. Moreover, it is possible to address opting-out of all persistent cookies at once, so that users do not have to worry about blocking individual persistent cookies. Embodiments may allow less threatening types of cookies, such as session cookies. However, it is important for users to be aware that even session cookies can present a privacy risk. While session cookies are automatically deleted, users should be aware that embodiments that allow session cookies may allow certain web sites to gather information about the user that he or she may wish to keep private.

The disclosed embodiments incorporate a variety of features in new and advantageous ways. They provide for easily and conveniently managing persistent cookies in a way that allows a user to opt-out of persistent cookies and avoid the issues of being tracked with one simple choice. Furthermore, there are embodiments which allow session cookies, and target persistent advertising cookies so that the goal of protecting privacy and security can be reached while minimizing the negative impact on a web browser's functionality.

By allowing opt-outs to be easily turned on and off, and providing for handling all opt-outs at once, the approach presented herein is quite advantageous because it is straightforward to use. Embodiments adapt to the specific requirements of specific websites with respect to persistent opt-out cookies so that users can turn cookies off and on all at once and the user does not have to take special steps to specify sites or ensure compatibility once the choice to activate opting-out has been made. Various embodiments provide for even greater tailoring of the opting-out that extends the power of the approach presented herein still further.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for managing persistent cookies in a web browser, comprising:
    scanning, by a persistent cookie management tool installed in the web browser, a cookie repository of the web browser to identify a website associated with at least one persistent cookie the persistent cookie management tool being executed by one or more processors;
    for the identified website, storing, in the cookie repository, by the persistent cookie management tool, at least one persistent opt-out cookie associated with the identified website, such that the at least one persistent opt-out cookie is protected from being changed when other cookies in the cookie repository are changed; and
    transmitting the at least one persistent opt-out cookie associated with the identified website to the website to cause the website to block interest-based advertising.

2. The computer-implemented method of claim 1, further comprising:
    receiving, at a persistent cookie management tool installed in the web browser, a request to opt out of at least one persistent cookie from a website.

3. The computer-implemented method of claim 1, further comprising:
    deleting any other persistent cookies associated with the identified website that are present in the cookie repository.

4. The computer-implemented method of claim 1, further comprising:
    for the identified website, preventing, by the persistent cookie management tool, additional persistent cookies from being stored in the cookie repository by the website.

5. The computer-implemented method of claim 1, wherein the storing and transmitting are repeated for all websites accessed by the user.

6. The computer-implemented method of claim 1, further comprising:
    allowing a session cookie for a website with a persistent opt-out cookie.

7. The computer-implemented method of claim 1, wherein each persistent opt-out cookie has a customized format that corresponds to the website with which the persistent opt-out cookie is associated.

8. The computer-implemented method of claim 1, wherein each persistent opt-out cookie comprises a name and value pair.

9. The computer-implemented method of claim 1, wherein the persistent cookie management tool only blocks cookie usage for advertising purposes.

10. A system for managing persistent cookies in a web browser, the system comprising:
    one or more processors, configured to execute a web browser, the web browser accessing websites via a network interface;
    a persistent cookie management tool installed in the web browser, wherein the persistent cookie management tool is configured to scan a cookie repository of the web browser to identify a website associated with at least one persistent cookie;
    wherein the persistent cookie management tool is further configured to store, for the identified website, in the cookie repository, at least one persistent opt-out cookie associated with the identified website, such that the at least one persistent opt-out cookie is protected from being changed when other cookies in the cookie repository are changed, and
    wherein the persistent cookie management tool is further configured to transmit the at least one persistent opt-out cookie associated with the identified website to the website to cause the website to block interest-based advertising.

11. The system of claim 10, wherein the persistent cookie management tool is further configured to receive a request to opt out of at least one persistent cookie from a website.

12. The system of claim 10, wherein the persistent cookie management tool is configured to delete any other persistent cookies associated with the identified website that are present in the cookie repository.

13. The system of claim 10, wherein the persistent cookie management tool is configured to, for the identified website, prevent additional persistent cookies from being stored in the cookie repository by the website.

14. The system of claim 10, wherein persistent cookie management tool is configured to repeat the storing and transmitting for all websites accessed by the user.

15. The system of claim 10, wherein the persistent cookie management tool is configured to allow a session cookie for a website with a persistent opt-out cookie.

16. The system of claim 10, wherein each persistent opt-out cookie has a customized format that corresponds to the website with which the persistent opt-out cookie is associated.

17. The system of claim 10, wherein each persistent opt-out cookie comprises a name and value pair.

18. The system of claim 10, wherein the persistent cookie management tool is configured to block only cookies usage for advertising purposes.

19. A non-transitory computer readable storage medium having instructions stored thereon that, when executed by one or more processors, cause the one or more processors to execute a method for managing persistent cookies in a web browser, the method comprising:

scanning, by a persistent cookie management tool installed in the web browser, a cookie repository of the web browser to identify a website associated with at least one persistent cookie;

for the identified website, storing, in the cookie repository, by the persistent cookie management tool, at least one persistent opt-out cookie associated with the identified website, such that the at least one persistent opt-out cookie is protected from being changed when other cookies in the cookie repository are changed; and transmitting the at least one persistent opt-out cookie associated with the identified website to the website to cause the website to block interest-based advertising.

20. The non-transitory computer readable storage medium of claim 19, the method further comprising:

receiving, by the persistent cookie management tool, a request to opt out of at least one persistent cookie from a website.

* * * * *